United States Patent [19]
Mackie et al.

[11] Patent Number: 5,930,756
[45] Date of Patent: *Jul. 27, 1999

[54] METHOD, DEVICE AND SYSTEM FOR A MEMORY-EFFICIENT RANDOM-ACCESS PRONUNCIATION LEXICON FOR TEXT-TO-SPEECH SYNTHESIS

[75] Inventors: Andrew William Mackie, Schaumburg; Corey Andrew Miller, Chicago; Orhan Karaali, Rolling Meadows, all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/880,604

[22] Filed: Jun. 23, 1997

[51] Int. Cl.$^6$ .................................................. G06F 17/27
[52] U.S. Cl. .......................... 704/260; 704/258; 704/503
[58] Field of Search .................................. 704/260, 258, 704/503, 231, 12

[56] References Cited

U.S. PATENT DOCUMENTS

| | | | |
|---|---|---|---|
| 4,641,264 | 2/1987 | Nitta et al. | 364/900 |
| 5,323,316 | 6/1994 | Kadashevich et al. | 395/793 |
| 5,333,313 | 7/1994 | Heising | 395/600 |
| 5,369,577 | 11/1994 | Kadashevich et al. | 395/793 |
| 5,651,095 | 7/1997 | Ogden | 704/260 |
| 5,708,829 | 1/1998 | Kadashevich et al. | 395/793 |

*Primary Examiner*—David R. Hudspeth
*Assistant Examiner*—Daniel Abebe
*Attorney, Agent, or Firm*—Darleen J. Stockley

[57] ABSTRACT

A method (400, 900, 1000, 1100), device (1205, 1306) and system (1207, 1308) provide memory-efficient encoding of the random-access lexicon for a text-to-speech synthesis system. The method generates word pronunciations based on efficient retrieval of stored pronunciation information and disambiguation information for an input word, by dividing the input word into a stem and a maximal suffix having a maximal suffix code and then generating at least one word pronunciation based on the stem and the maximal suffix.

30 Claims, 14 Drawing Sheets

FIG. 4

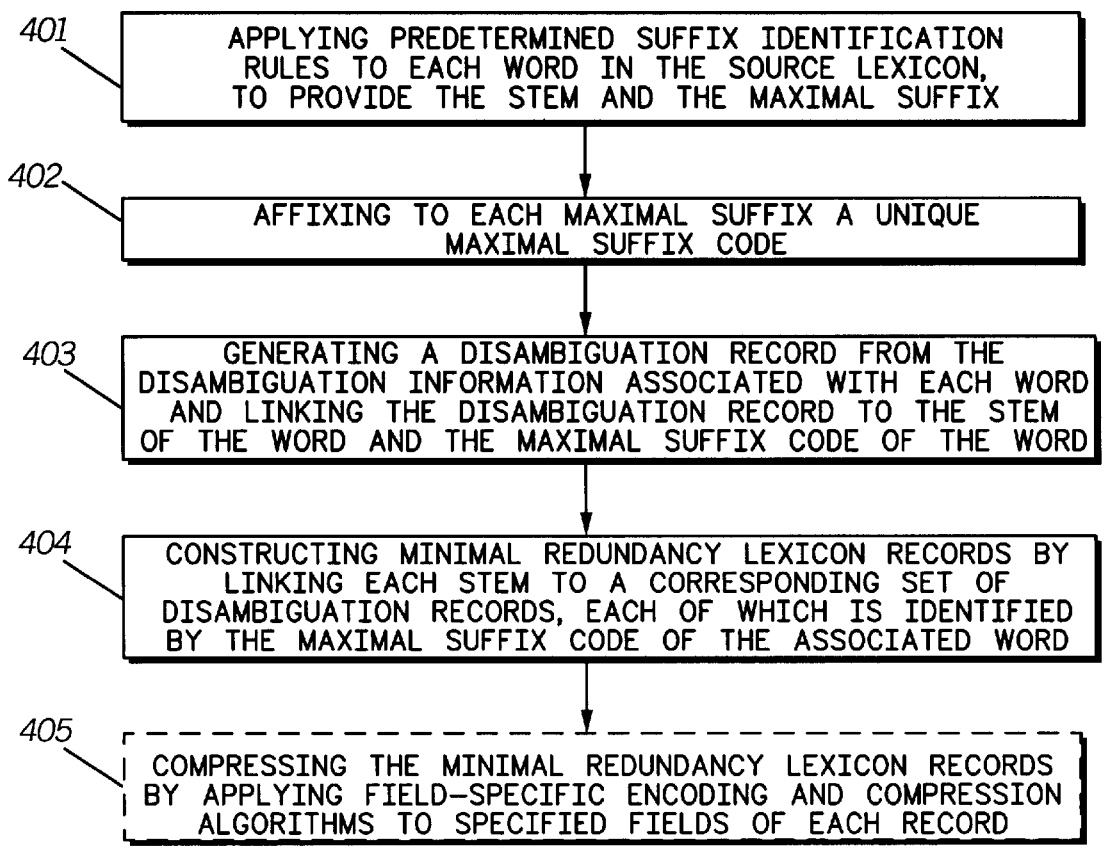

401 — APPLYING PREDETERMINED SUFFIX IDENTIFICATION RULES TO EACH WORD IN THE SOURCE LEXICON, TO PROVIDE THE STEM AND THE MAXIMAL SUFFIX

402 — AFFIXING TO EACH MAXIMAL SUFFIX A UNIQUE MAXIMAL SUFFIX CODE

403 — GENERATING A DISAMBIGUATION RECORD FROM THE DISAMBIGUATION INFORMATION ASSOCIATED WITH EACH WORD AND LINKING THE DISAMBIGUATION RECORD TO THE STEM OF THE WORD AND THE MAXIMAL SUFFIX CODE OF THE WORD

404 — CONSTRUCTING MINIMAL REDUNDANCY LEXICON RECORDS BY LINKING EACH STEM TO A CORRESPONDING SET OF DISAMBIGUATION RECORDS, EACH OF WHICH IS IDENTIFIED BY THE MAXIMAL SUFFIX CODE OF THE ASSOCIATED WORD

405 — COMPRESSING THE MINIMAL REDUNDANCY LEXICON RECORDS BY APPLYING FIELD-SPECIFIC ENCODING AND COMPRESSION ALGORITHMS TO SPECIFIED FIELDS OF EACH RECORD

400

FIG.6
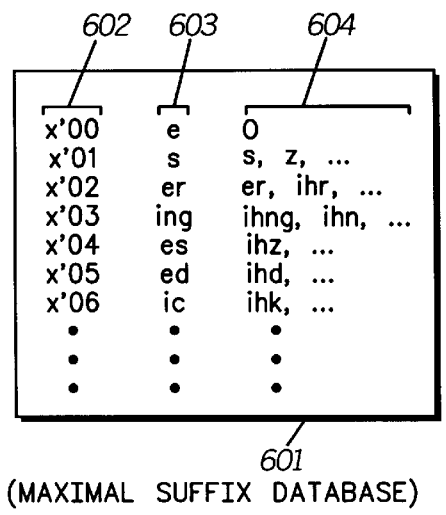
(MAXIMAL SUFFIX DATABASE)
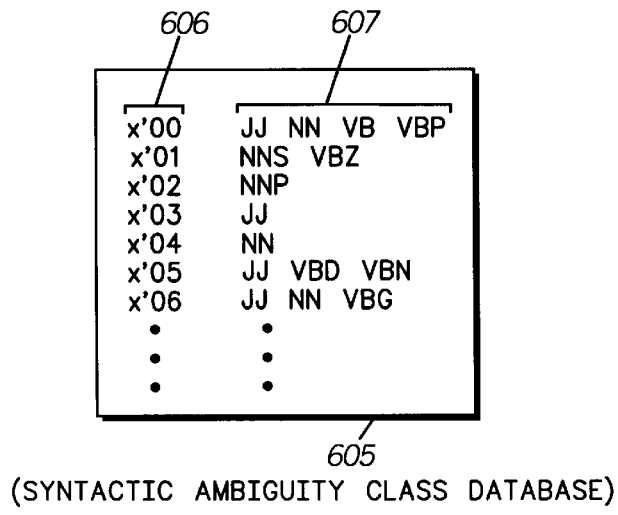
(SYNTACTIC AMBIGUITY CLASS DATABASE)
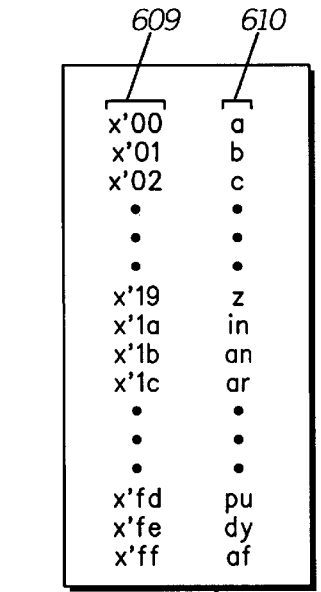
(STEM ENCODING DATABASE)
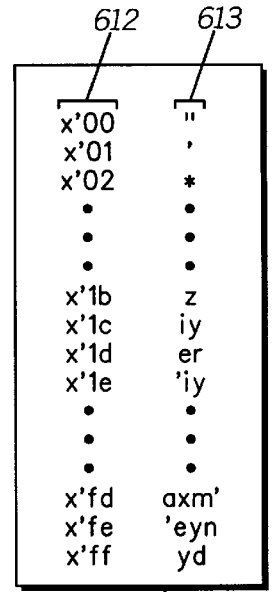
(PRONUNCIATION ENDCODING DATABASE)

FIG. 7

```
702                            703
comput  #  ation           k"aampyaxt  #  'eyshihn
comput  #  ational         k"aampyaxt  #  'eyshihnaxl
comput  #  ations          k"aampyaxt  #  'eyshihnz
comput  #  e               kaxmpy'uwt  #
comput  #  ed              kaxmpy'uwt  #  ihd
comput  #  er              kaxmpy'uwt  #  er
comput  #  erization       kaxmpy"uwt  #  axrihz'eyshihn
comput  #  erize           kaxmpy'uwt  #  axr"ayz
comput  #  erized          kaxmpy'uwt  #  axr"ayzd
comput  #  erizes          kaxmpy'uwt  #  axr"ayzihz
comput  #  erizing         kaxmpy'uwt  #  axr"ayzihng
comput  #  erlike          kaxmpy'uwt  #  erl"ayk
comput  #  ers             kaxmpy'uwt  #  erz
comput  #  es              kaxmpy'uwt  #  s
comput  #  ing             kaxmpy'uwt  #  ihng
comput  #  ist             kaxmpy'uwt  #  ihst
```
701

(Stem compression)          (Stem pronunciation compression 1)

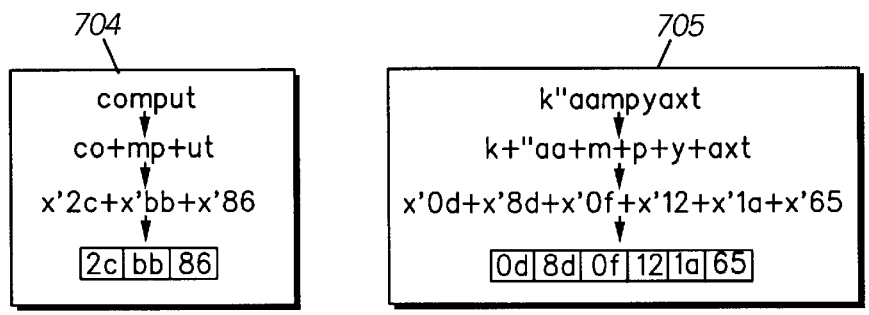

(Stem pronunciation compression 2)  (Stem pronunciation compression 3)

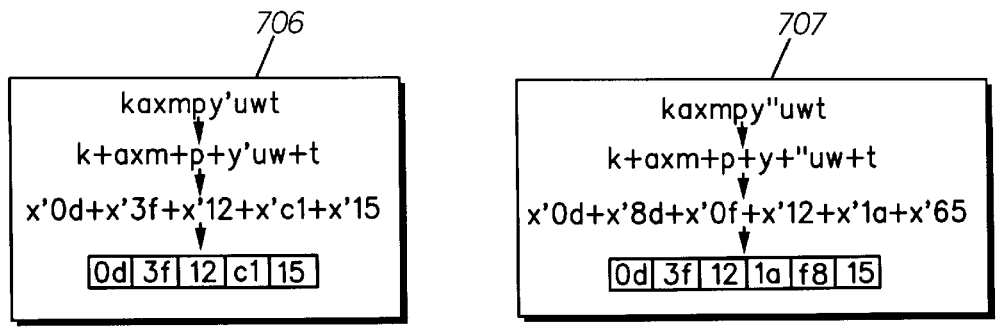

700

METHOD, DEVICE AND SYSTEM FOR A MEMORY-EFFICIENT RANDOM-ACCESS PRONUNCIATION LEXICON FOR TEXT-TO-SPEECH SYNTHESIS

FIELD OF THE INVENTION

The present invention relates to pronunciation lexicons used in text-to-speech synthesis, and more particularly to the efficient encoding, compression, and random access of information stored in such lexicons.

BACKGROUND OF THE INVENTION

As shown in FIG. 1 numeral 100, to convert text to speech, text-to-speech synthesizer systems typically use the following four-step process. Step 1 is the tokenization step, in which a text stream (101) is tokenized into text tokens by a text tokenizer (102). Step 2 is the lexicon access step, in which each text token is looked up in a lexicon (104) by a lexicon accessor (103). The lexicon consists of a static lexicon (105) that contains pronunciations for specified words, and a dynamic lexicon (106) that contains a procedure for generating pronunciations for the words that are not stored in the static lexicon. Because some words (e.g., "live") have more than one pronunciation, the lexicon access step will result in at least one pronunciation token being retrieved corresponding to each text token. Step 3 is the disambiguation step, in which all pronunciation ambiguities are resolved by a disambiguator (107), resulting in a one-to-one mapping between text tokens and pronunciation tokens. Finally, Step 4 is the speech synthesis step, where the disambiguated list of pronunciation tokens is passed to a speech synthesizer (108), which pronounces it.

An example of the application of the above process is presented in FIG. 2, numeral 200. The text stream (201) is input to the tokenization step, which yields a list of text tokens (202) as its output. The list of text tokens is input to the lexicon access step, which yields a list of pronunciation tokens (203) as its output. As can be seen in the figure, several text tokens have more than one pronunciation token associated with them; e.g., "live" (which may be pronounced [layv] or [lihv]); the abbreviation "St." (which may be pronounced [seynt] or [striyt]), etc. The list of pronunciation tokens is input to the disambiguation step, which yields a list of disambiguated pronunciation tokens (204) as its output. The list of disambiguated pronunciation tokens is then input to the speech synthesizer, which pronounces it.

The static lexicon contains words, pronunciations, and information (such as part-of-speech tags and word frequencies) that is useful to the disambiguator in disambiguating word pronunciations according to their context. The dynamic lexicon contains procedures (e.g., an orthographic analysis routine) that can generate a plausible pronunciation for a word from its orthographic form. For the speech synthesis system to operate in real time on computing platforms with limited memory and cycle time, the static lexicon must be organized to permit high-speed random access while using minimal storage.

Standard file-compression techniques are not suitable for compressing the static lexicon because they do not allow random access to the compressed data. In addition, compression methods specifically developed for compressing the entries of conventional dictionaries are also unsuitable because of the differences in structure and usage between such dictionaries and the static lexicon. One crucial distinction between the static lexicon and a conventional dictionary is that the static lexicon need not contain any information that can be generated by the dynamic lexicon.

Additionally, the information stored in the static lexicon is substantially different than the information typically stored in the entries of a conventional dictionary, and is therefore not amenable to compression methods that do not exploit its specific regularities. One example of such a regularity is the application of morphologically based suffix-stripping rules to words regardless of the semantic consequences of such rules. For example, "ing" is a common English suffix with a predictable pronunciation. However, a rule that stripped "ing" without exception would be problematic in the conventional dictionary because it would complicate the accurate matching of word forms to their meanings; e.g., stripping "ing" from "bearing" would have to be optional in order to identify both the nominal base form (bearing) and the verbal base form (bear), while stripping it from "bring" would have to be prohibited entirely. However, because such rules may lead to the identification of plausible pronunciations in the static lexicon of a text-to-speech synthesis system, they are good candidates for exploitation in the compression of such a lexicon.

Hence, there is a need for a method, system and device for encoding the pronunciations stored in the lexicon of a text-to-speech synthesis system so that the storage requirements of the lexicon are substantially reduced without adversely impacting the rapid random access of pronunciations from the lexicon.

BRIEF DESCRIPTION OF THE DRAWINGS

FIG. 4 is a flowchart of one embodiment of steps in accordance with the encoding method of the present invention, to construct a minimal redundancy lexicon.

FIG. 6 is a schematic representation of one embodiment of the database tables used for encoding different types of information stored in the minimal redundancy lexicon in accordance with the present invention.

FIG. 7 is a schematic representation of one embodiment of the decomposition and compression of the stems and pronunciations in the minimal redundancy lexicon in accordance with the present invention.

DETAILED DESCRIPTION OF A PREFERRED EMBODIMENT

The present invention provides a method for encoding and decoding the lexicon of a text-to-speech synthesis system so that the memory requirements of the system are substantially reduced without adversely impacting the rapid random access of pronunciations from the lexicon. Because the word orthographies and pronunciations in the lexicon are characterized by a large amount of morphological regularity, the disclosed method exploits this regularity. Furthermore, the disclosed method, by taking into account the morphological structure of word orthographies and pronunciations, has the additional benefit of allowing the generation of plausible pronunciations for partially identified words based on the default pronunciations of their stems and maximal suffixes.

Figure 1:
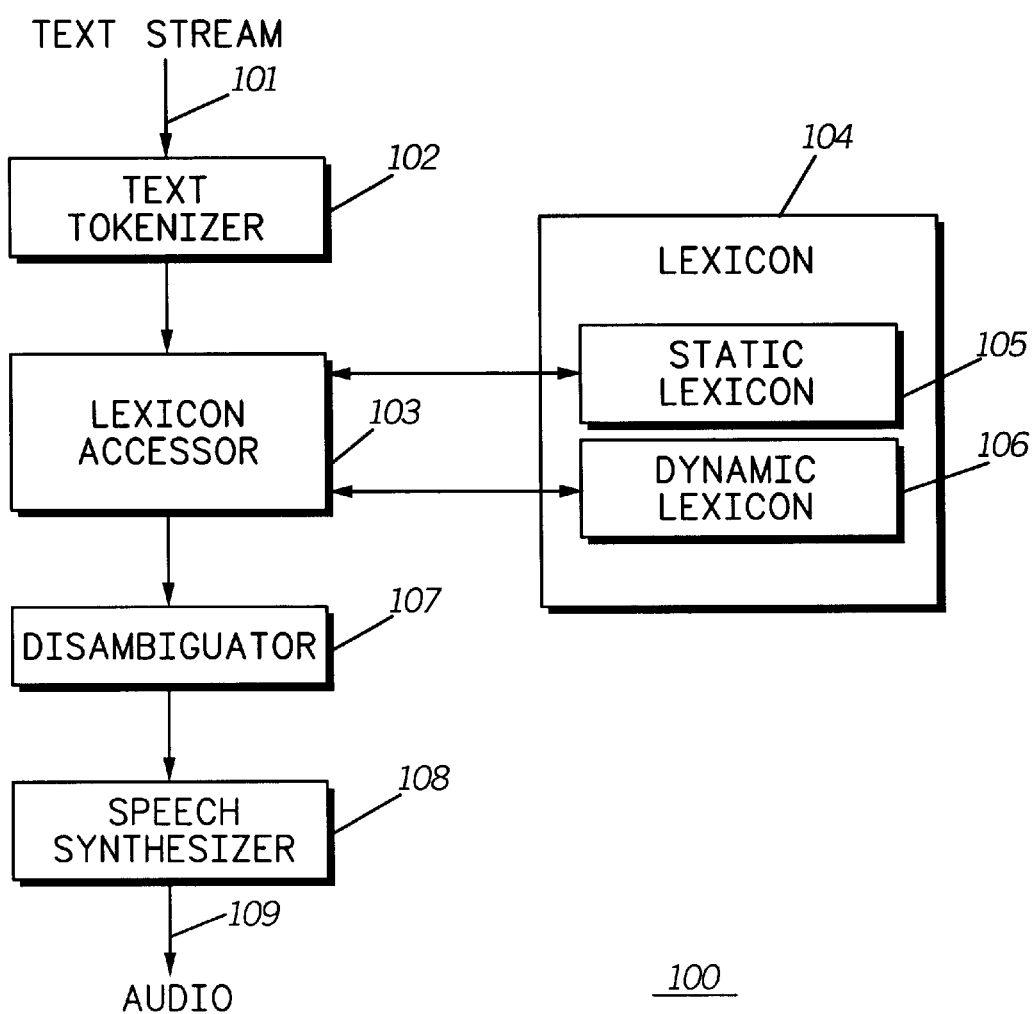
FIG. 1 is a schematic representation of a text-to-speech synthesis system for generating speech synthesizer pronunciation tokens from text tokens as is known in the art.
Figure 2:
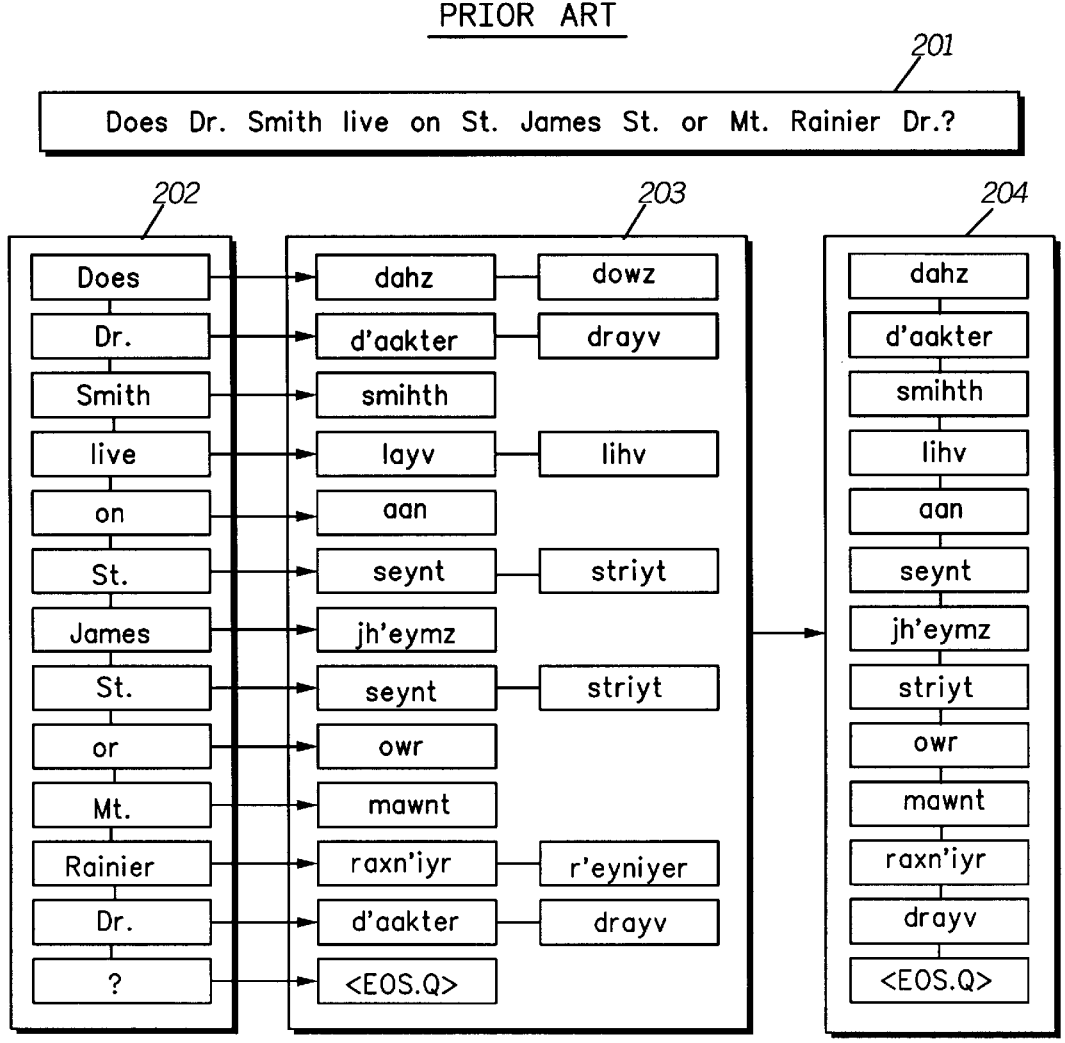
FIG. 2 is a schematic representation of the processing of a text by the system of FIG. 1 as is known in the art.
Figure 3:
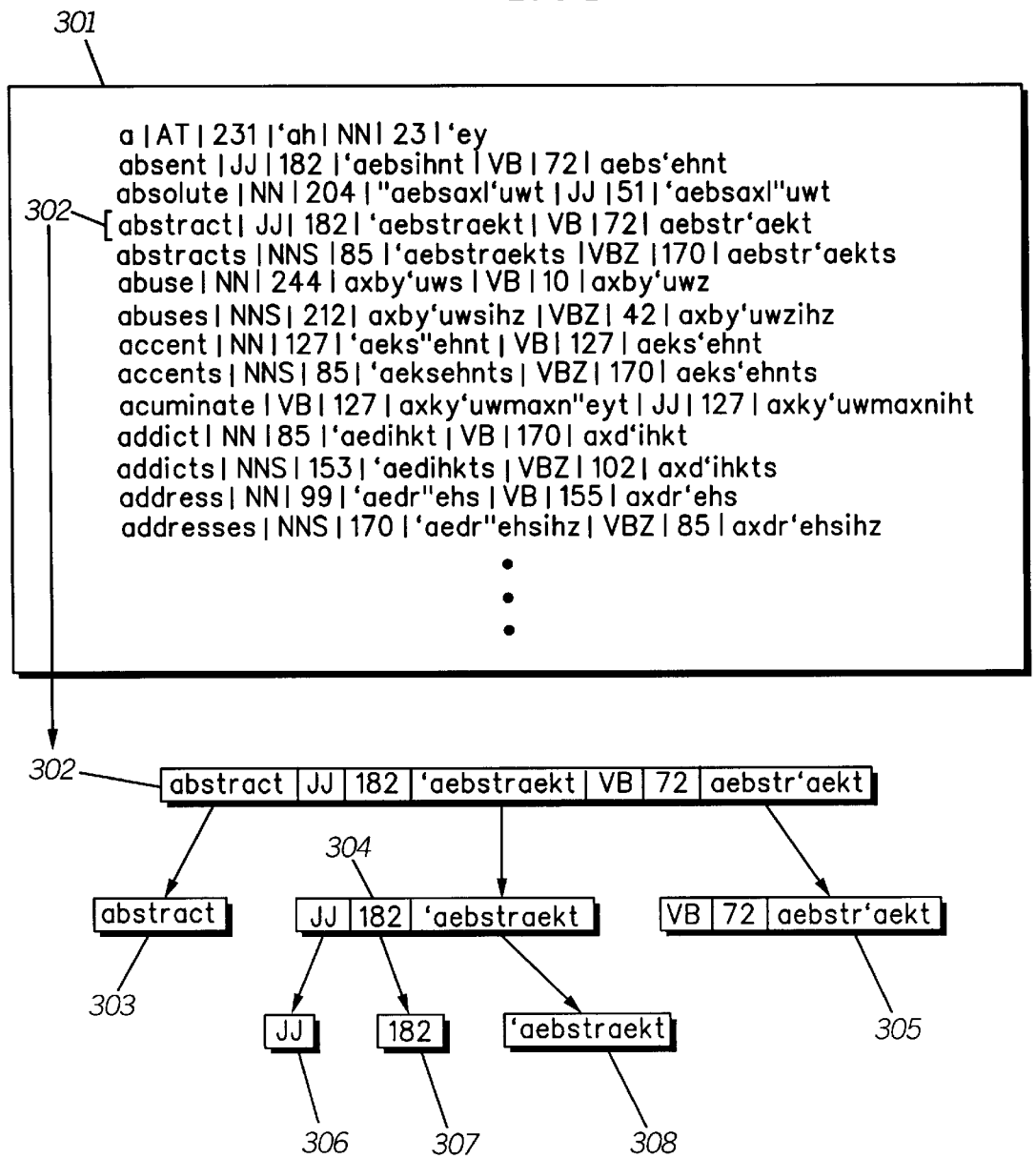
FIG. 3 is a schematic representation of one embodiment of a source lexicon containing words, pronunciations, and disambiguation information in accordance with the present invention.

FIG. 3, numeral 300, is a schematic representation of one embodiment of a source lexicon (301) containing words, pronunciations, and disambiguation information in accordance with the present invention. The source lexicon contains at least one source lexicon record (302). Each source lexicon record contains the orthographic form of a word (303) followed by at least one disambiguation field (304, 305), each of which contains a word pronunciation (308), along with disambiguation information (306, 307) that may be used for word pronunciation disambiguation.

As shown in the steps set forth in FIG. 4, numeral 400, the method of the present invention provides the efficient generation of random-access retrieval keys derived from the orthographic forms of words, each of which is divided into a stem and a maximal suffix. The random-access retrieval key derived from the word permits efficient retrieval of the stored pronunciation information for the word, along with any other associated linguistic information that has been linked to the stored pronunciation information. The method includes the steps of: A) applying (401) predetermined suffix identification rules to each word in the source lexicon, to provide the stem and the maximal suffix; B) affixing (402) to each maximal suffix a unique maximal suffix code; C) generating (403) a disambiguation record from the disambiguation information associated with each word and linking the disambiguation record to the stem of the word and the maximal suffix code of the word; D) constructing (404) minimal redundancy lexicon records by linking each stem to a corresponding set of disambiguation records, each of which is identified by the maximal suffix code of the associated word; and E) compressing (405) the minimal redundancy lexicon records by applying field-specific encoding and compression algorithms to specified fields of each record. The disclosed method results in the construction of a minimal redundancy lexicon, which has minimal redundancy in suffix information and stem information because only one copy is stored of each stem and maximal suffix, even though the stems and maximal suffixes occur multiple times in the source lexicon.

Figure 5:
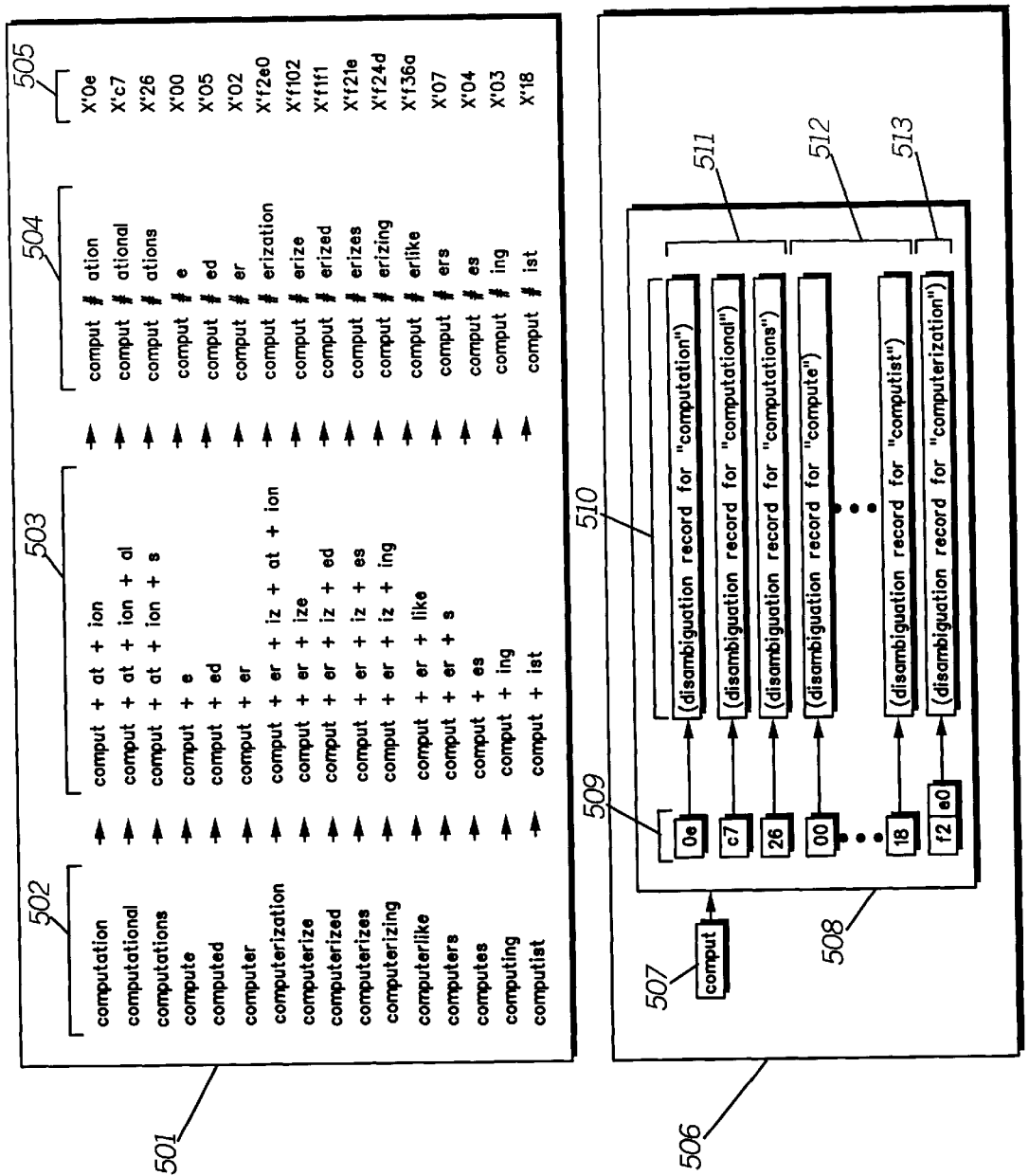
FIG. 5 is a schematic representation of one embodiment of the encoding of random access keys for the minimal redundancy lexicon in accordance with the present invention.

In the example shown in FIG. 5, numeral 500, a set of words based on the root "compute" is processed by the method presented in FIG. 4 to yield stems and maximal suffix codes, as summarized in four lists (501). The output of this process is then used to construct a storage structure (506) for the disambiguation records associated with these words.

Each word in the word list (502) is analyzed by predetermined suffix identification rules to result in a stem followed by at least one suffix (503). The suffixes in this list are then each combined into the maximal suffix (504) for the word. Each maximal suffix is then associated with a unique maximal suffix code as shown in the maximal suffix code list (505).

The storage structure (506) is constructed as follows. The stem (507) references a minimal redundancy lexicon record (508), which contains at least one maximal suffix code (509). Each maximal suffix code references a disambiguation record (510). Note that the order of the records in the storage structure is no longer the same as in the original word list, because in the storage structure all words which correspond to a specific pronunciation of the stem must be grouped together. Specifically, the first three records (511) correspond to the stem pronunciation [k"aampyaxt], the next 12 records (512) correspond to the stem pronunciation [k"kaxmp'ut], and the final record (513) corresponds to the stem pronunciation [kaxmpy"ut]. Further details concerning the encoding of the disambiguation records are presented below in the discussion of FIG. 8.

In the example shown in FIG. 6, numeral 600, representative samples of four databases used to compress the minimal redundancy lexicon by using multigram compression and byte-code indexing are presented. Other compression techniques such as Huffman coding or arithmetic coding may also be used. The maximal suffix database (601) consists of a set of maximal suffixes (603) stored as an ordered list in which each element is indexed by a unique hexadecimal number (602). Each maximal suffix in the list has a set of maximal suffix pronunciations (604), the first element of which is the default maximal suffix pronunciation. In the example, the maximal suffix "e" is indexed by x'00 and has the default maximal suffix pronunciation of silence (represented by the symbol "0"), while the maximal suffix "s" is indexed by x'01 and has the default maximal suffix pronunciation [s], as well as alternative maximal suffix pronunciations, the first one of which is [z]. Alternative maximal suffix pronunciations are accessed using the corresponding maximal suffix pronunciation code; for example, to access the maximal suffix pronunciation [z] for the maximal suffix "s", the maximal suffix pronunciation code x'01 would be used.

The size of the maximal suffix database depends on the number of maximal suffixes required to encode the minimal redundancy lexicon. In the typical case that this number exceeds 256 but is less than 4,336, the following method may be used to construct the maximal suffix codes: single-byte codes are used for only the 240 highest frequency maximal suffixes, with the remaining suffixes encoded using two-byte codes, the first byte of which is a hexadecimal number in the range x'f1 to x'ff. This ensures that all two-byte suffix codes may be distinguished from single-byte codes by inspection of the initial byte.

The syntactic ambiguity class database (605) consists of a set of syntactic ambiguity class vectors (607), each of which consists of at least one syntactic tag (e.g., "NN", "VB", etc.) that defines a set of possible syntactic usages, stored as an ordered list. Each syntactic ambiguity class vector is indexed by a unique hexadecimal number (606). In the example, the syntactic ambiguity class vector "JJ NN VB VBP" (consisting of four syntactic tags) is indexed by x'00, while the syntactic ambiguity class vector "JJ" (consisting of a single tag) is indexed by x'03. As was the case for the maximal suffix database, the size of the syntactic ambiguity class database depends on the number of ambiguity classes required to categorize the words in the minimal redundancy lexicon. In the typical case that this number exceeds 256 but is less than 512, the following method may be used to construct the maximal suffix codes: single-byte codes are used for only the 255 highest frequency ambiguity classes, with the remaining classes encoded using two-byte codes, the first byte of which is the hexadecimal number x'ff. This ensures that all two-byte ambiguity class codes may be distinguished from single-byte codes by inspection of the initial byte.

The stem encoding database (608) consists of an ordered list of character strings (610), each of which is indexed by a unique hexadecimal number (609). In the example, the first 26 of these character strings correspond to the unigrams of the alphabet used to encode the words, while the remainder correspond to multigrams composed from the unigrams of the alphabet used to encode the words. Thus the unigram "a" is indexed by x'00, while the multigram "an" is indexed by x'1b. In the example, the stem encoding database is limited in size to 256 elements, to ensure the byte-alignment of compressed words.

The pronunciation encoding database (611) consists of an ordered list of character strings (613), each of which is indexed by a unique hexadecimal number (612). In the example, the first 28 of these character strings correspond to the unigrams of the alphabet used to encode the pronunciations, while the remainder correspond to multigrams composed from the unigrams of the alphabet used to encode the pronunciations. Thus the unigram "*" is indexed by x'02, while the multigram "er" is indexed by x'1d. In the example, this database is limited in size to 256 elements, to ensure the byte-alignment of compressed pronunciations.

In the example shown in FIG. 7, numeral 700, the pronunciation (703) of each word in the set of words based on the stem "comput" (702) is segmented relative to the stem and maximal suffix of the word. As can be seen in the figure, the stem "comput" has three corresponding stem pronunciations: [k"aampyaxt], [kaxmpy'uwt], and [kaxmpy"uwt]. The stem is then compressed (704) using the multigrams stored in the stem encoding database (608). The stem pronunciations are likewise compressed (705, 706, 707) using the multigrams stored in the pronunciation encoding database (611). In each case, the use of multigram compression results in a substantial reduction of storage usage: from 6 to 3 bytes in the case of the word stem, and from 10 to 6 bytes in the case of two of the three pronunciations, and from 10 to 5 bytes in the case of the third.

Figure 8:
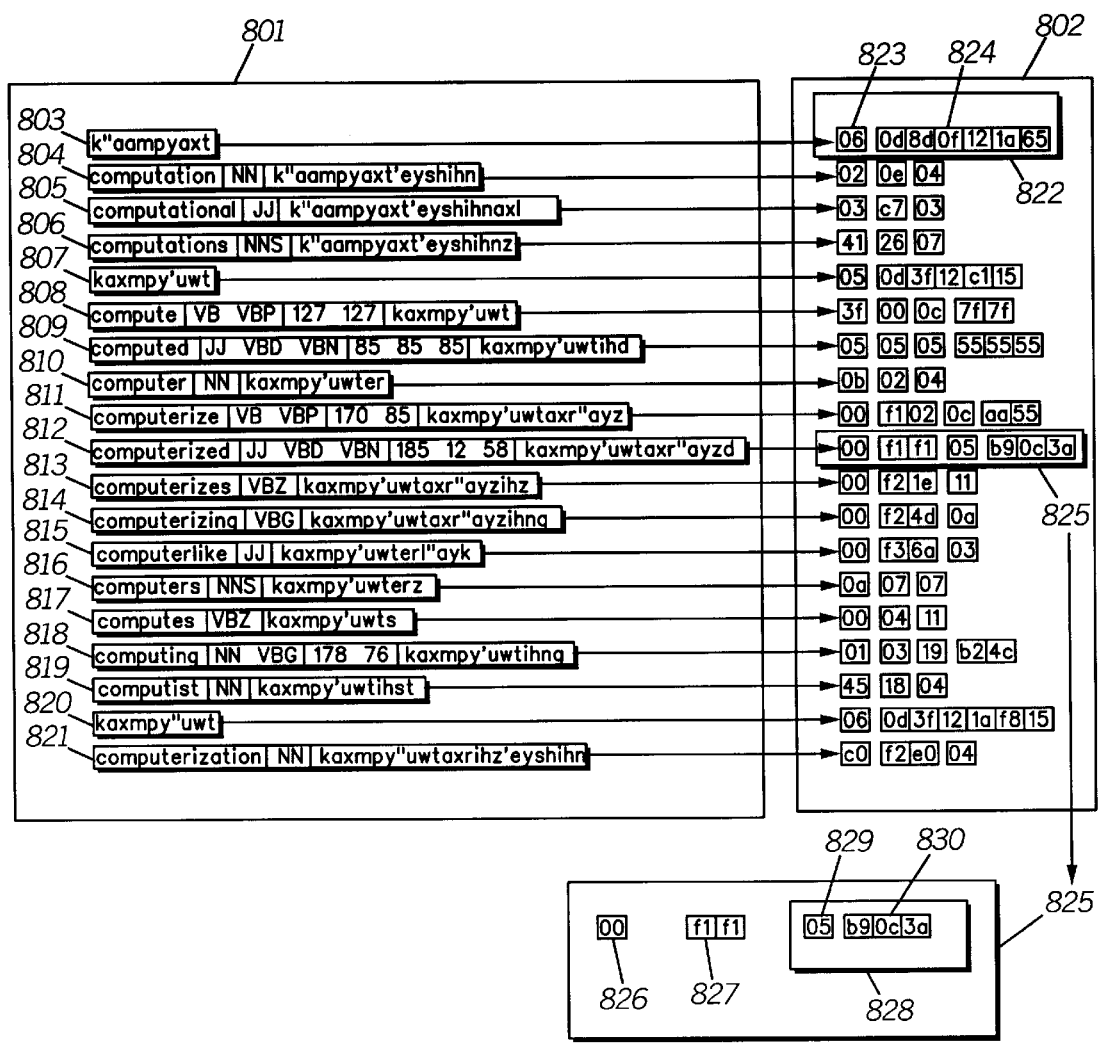
FIG. 8 is a schematic representation of one embodiment of the encoding of the disambiguation records in the minimal redundancy lexicon in accordance with the present invention.

In the example shown in FIG. 8, numeral 800, the set of source lexicon records (801) corresponding to the words based on the stem "comput" is processed by the disclosed method, which reduces it to a minimal redundancy lexicon record (802) occupying 86 bytes of contiguous storage (the spacing in the list is provided for readability only). The minimal redundancy lexicon contains the set of minimal redundancy lexicon records and the corresponding set of stems from the source lexicon.

The minimal redundancy lexicon record contains at least one stem pronunciation record (822) and at least one word information record (825). The stem information record contains a compressed stem pronunciation (824) preceded by a length byte (823). The set of stem pronunciations corresponding to the stem "comput" consists of the three stem pronunciations (803, 807, 820) shown in the figure. The word information record contains a control byte (826), a maximal suffix code (827), and a disambiguation record (828). The disambiguation record contains a syntactic ambiguity class vector code (829) and optional distributional information (830). The minimal redundancy lexicon record is decoded as follows (all bytes are interpreted as two-digit hexadecimal numbers).

The first seven bytes of the minimal redundancy lexicon record are used to encode the first stem pronunciation (803). This pronunciation (k"aampyaxt) was coded into six bytes as previously shown in FIG. 7, and is preceded by its length, which is coded as x'06.

The next three bytes of the minimal redundancy lexicon record are used to encode the word "computation" and its related information (804). The first of these bytes is the control byte, which is interpreted as follows: (1) the first bit is set when the current word is the last one in the list corresponding to the word stem (in this example, "comput") used as the retrieval key; (2) the second bit is set when the current word is the last one in the list corresponding to the current pronunciation (in this example, [k"aampyaxt]); and (3) the remaining six bits are interpreted as the maximal suffix pronunciation code, which is a hexadecimal number referencing the correct pronunciation of the maximal suffix when it is applied to the current word, with the number x'3f (i.e., all six bits being set) interpreted as the lack of any pronunciation for the maximal suffix (e.g., when it is a "silent e").

In the example (804), the control byte is x'02, indicating that the pronunciation of "computation" is formed by concatenating the current stem pronunciation [k"aampyaxt] to the second alternate pronunciation for the word's maximal suffix ("ation"), which is ['eyshihn]. The second byte encodes the word's maximal suffix ("ation") and is therefore x'0e, and the third byte encodes the word's syntactic ambiguity class vector ("NN") and is therefore x'04. Because the syntactic ambiguity class vector contains a single tag, there is no distributional information associated with this word.

The next three bytes of the minimal redundancy lexicon record are used to encode the word "computational" and its related information (805). The first of these bytes is the control byte, which is x'03, indicating that the pronunciation of "computational" is formed by concatenating the current stem pronunciation [k"aampyaxt] to the third alternate pronunciation for the word's maximal suffix ("ational"), which is ['eyshihnaxl]. The second byte encodes the word's maximal suffix ("ational") and is therefore x'c7, and the third byte encodes the word's syntactic ambiguity class vector ("JJ") and is therefore x'03.

The next three bytes of the minimal redundancy lexicon record are used to encode the word "computations" and its related information (806). The first of these bytes is the control byte, which is x'41, indicating: (1) that this word is the last one in the list corresponding to the current stem pronunciation [k"aampyaxt] and (2) that the pronunciation of "computations" is formed by concatenating the current stem pronunciation [k"aampyaxt] to the first alternate pronunciation for the word's maximal suffix ("ations"), which is ['eyshihnz]. The second byte encodes the word's maximal suffix ("ations") and is therefore x'26, and the third byte encodes the word's syntactic ambiguity class vector ("NNS") and is therefore x'07.

Because the control byte of the previous word indicated that it was the last one corresponding to the current stem pronunciation, the next byte is interpreted as the length of the next stem pronunciation. This byte is x'05, which indicates that the next five bytes of the minimal redundancy lexicon record are to be interpreted as containing the next stem pronunciation, which decodes to [kaxmpy'uwt] (807).

The next five bytes of the minimal redundancy lexicon record are used to encode the word "compute" and its related information (808). The first of these bytes is the control byte, which is x'3f, indicating that this word is pronounced without appending any additional material to the stem pronunciation (i.e., as [kaxmpy'uwt]). The second byte encodes the word's maximal suffix ("e") and is therefore x'00, and the third byte encodes the word's syntactic ambiguity class vector ("VB VBP") and is therefore x'0c. Because the syntactic ambiguity class vector contains two tags, the next two bytes are interpreted as containing distributional information.

The next six bytes of the minimal redundancy lexicon record are used to encode the word "computed" and its related information (809). The first of these bytes is the control byte, which is x'05, indicating that the pronunciation of "computed" is formed by concatenating the current stem pronunciation [kaxmpy'uwt] to the fifth alternate pronunciation for the word's maximal suffix ("ed"), which is [ihd]. The second byte encodes the word's maximal suffix ("ed") and is therefore x'05, and the third byte encodes the word's syntactic ambiguity class vector ("JJ VBD VBN") and is therefore x'05. Because the syntactic ambiguity class vector contains three tags, the next three bytes are interpreted as containing distributional information.

The next three bytes of the minimal redundancy lexicon record are used to encode the word "computer" and its related information (810). The first of these bytes is the control byte, which is x'0b, indicating that the pronunciation of "computer" is formed by concatenating the current stem pronunciation [kaxmpy'uwt] to the eleventh alternate pronunciation for the word's maximal suffix ("er"), which is [er]. The second byte encodes the word's maximal suffix ("er") and is therefore x'02, and the third byte encodes the word's syntactic ambiguity class vector ("NN") and is therefore x'04.

The next six bytes of the minimal redundancy lexicon record are used to encode the word "computerize" and its related information (811). The first of these bytes is the control byte, which is x'00, indicating that the pronunciation of "computerize" is formed by concatenating the current stem pronunciation [kaxmpy'uwt] to the default pronunciation for the word's maximal suffix ("erize"), which is [axr"ayz]. The second byte and third bytes encode the word's maximal suffix ("erize") and are therefore x'f102. As previously discussed in reference to FIG. 6, because the first byte of this code is in the range x'f1 through x'ff, the code is recognized as a two-byte code and the second byte is interpreted accordingly. The fourth byte encodes the word's syntactic ambiguity class vector ("VB VBP") and is therefore x'0c. Because the syntactic ambiguity class vector contains two tags, the next two bytes are interpreted as containing distributional information.

The next seven bytes of the minimal redundancy lexicon record are used to encode the word "computerized" and its related information (812). The first of these bytes is the control byte, which is x'00, indicating that the pronunciation of "computerized" is formed by concatenating the current stem pronunciation [kaxmpy'uwt] to the default pronunciation for the word's maximal suffix ("erized"), which is [axr"ayzd]. The second and third bytes encode the word's maximal suffix ("erized") and are therefore x'f1f1 (note that this is another two-byte code). The fourth byte encodes the word's syntactic ambiguity class vector ("JJ VBD VBN") and is therefore x'05. Because the syntactic ambiguity class vector contains three tags, the next three bytes are interpreted as containing distributional information.

The next four bytes of the minimal redundancy lexicon record are used to encode the word "computerizes" and its related information (813). The first of these bytes is the control byte, which is x'00, indicating that the pronunciation of "computerizes" is formed by concatenating the current stem pronunciation [kaxmpy'uwt] to the default pronunciation for the word's maximal suffix ("erizes"), which is [axr"ayzihz]. The second and third bytes encode the word's maximal suffix ("erizes") and are therefore x'f11e. The fourth byte encodes the word's syntactic ambiguity class vector ("VBZ") and is therefore x'11.

The next four bytes of the minimal redundancy lexicon record are used to encode the word "computerizing" and its related information (814). The first of these bytes is the control byte, which is x'00, indicating that the pronunciation of "computerizing" is formed by concatenating the current stem pronunciation [kaxmpy'uwt] to the default pronunciation for the word's maximal suffix ("erizing"), which is [axr"ayzihng]. The second and third bytes encode the word's maximal suffix ("erizing") and are therefore x'f24d. The fourth byte encodes the word's syntactic ambiguity class vector ("VBG") and is therefore x'0a.

The next four bytes of the minimal redundancy lexicon record are used to encode the word "computerlike" and its related information (815). The first of these bytes is the control byte, which is x'00, indicating that the pronunciation of "computerlike" is formed by concatenating the current stem pronunciation [kaxmpy'uwt] to the default pronunciation for the word's maximal suffix ("erlike"), which is [erl"ayk]. The second and third bytes encode the word's maximal suffix ("erlike") and are therefore x'f36a. The fourth byte encodes the word's syntactic ambiguity class vector ("JJ") and is therefore x'03.

The next three bytes of the minimal redundancy lexicon record are used to encode the word "computers" and its related information (816). The first of these bytes is the control byte, which is x'0a, indicating that the pronunciation of "computers" is formed by concatenating the current stem pronunciation [kaxmpy'uwt] to the tenth alternate pronunciation for the word's maximal suffix ("ers"), which is [erz]. The second byte encodes the word's maximal suffix ("ers") and is therefore x'07, and the third byte encodes the word's syntactic ambiguity class vector ("NNS") and is therefore x'07.

The next three bytes of the minimal redundancy lexicon record are used to encode the word "computes" and its related information (817). The first of these bytes is the control byte, which is x'00, indicating that the pronunciation of "computes" is formed by concatenating the current stem pronunciation [kaxmpy'uwt] to the default pronunciation for the word's maximal suffix ("es"), which is [s]. The second byte encodes the word's maximal suffix ("es") and is therefore x'04, and the third byte encodes the word's syntactic ambiguity class vector ("VBZ") and is therefore x'11.

The next five bytes of the minimal redundancy lexicon record are used to encode the word "computing" and its related information (818). The first of these bytes is the control byte, which is x'01, indicating that the pronunciation of "computing" is formed by concatenating the current stem pronunciation [kaxmpy'uwt] to the first alternate pronunciation for the word's maximal suffix ("ing"), which is [ihng]. The second byte encodes the word's maximal suffix ("ing") and is therefore x'03, and the third byte encodes the word's syntactic ambiguity class vector ("NN VBG") and is therefore x'19. Because the syntactic ambiguity class vector contains two tags, the next two bytes are interpreted as containing distributional information.

The next three bytes of the minimal redundancy lexicon record are used to encode the word "computist" and its related information (819). The first of these bytes is the control byte, which is x'45, indicating: (1) that this word is the last one in the list corresponding to the current stem pronunciation [kaxmpy'uwt], and (2) that the pronunciation of "computist" is formed by concatenating the current stem pronunciation [kaxmpy'uwt] to the fifth alternate pronunciation for the word's maximal suffix ("ist"), which is [ihst]. The second byte encodes the word's maximal suffix ("ist") and is therefore x'18, and the third byte encodes the word's syntactic ambiguity class vector ("NN") and is therefore x'04.

Because the control byte of the previous word indicated that it was the last one corresponding to the current stem pronunciation, the next byte is interpreted as the length of the next stem pronunciation. This byte is x'06, which indicates that the next six bytes of the minimal redundancy lexicon record are to be interpreted as containing the next stem pronunciation, which decodes to [kaxmpy"uwt] (820).

The next four bytes of the minimal redundancy lexicon record are used to encode the word "computerization" and its related information (821). The first of these bytes is the control byte, which is x'c0, indicating: (1) that this word is both the last one in the list corresponding to the current stem pronunciation [kaxmpy"uwt] and the last one in the list corresponding to the word stem ("comput") used as the retrieval key, and (2) that the pronunciation of "computerization" is formed by concatenating the current stem pronunciation [kaxmpy"uwt] to the default pronunciation for the word's maximal suffix ("erization"), which is [axrihz'eyshihn]. The second byte and third bytes encode the word's maximal suffix ("erization") and are therefore x'f2e0. The fourth byte encodes the word's syntactic ambiguity class vector ("NN") and is therefore x'04.

Figure 9:
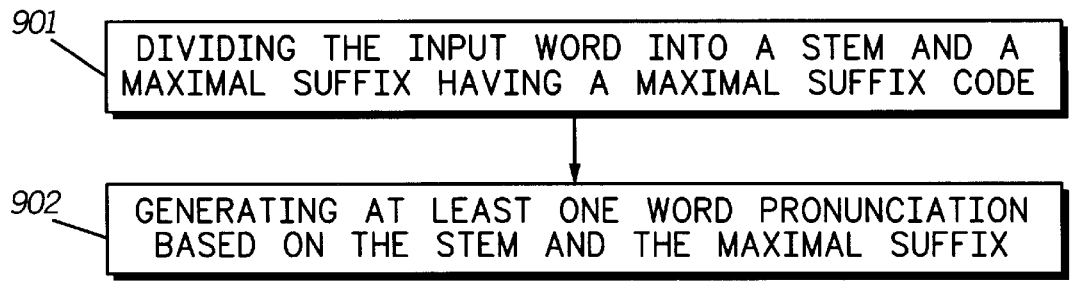
FIG. 9 is a flow chart of one embodiment of steps in accordance with the decoding method of the present invention, which provides efficient means of generating word pronunciations when given the orthographic forms of words.
Figure 10:
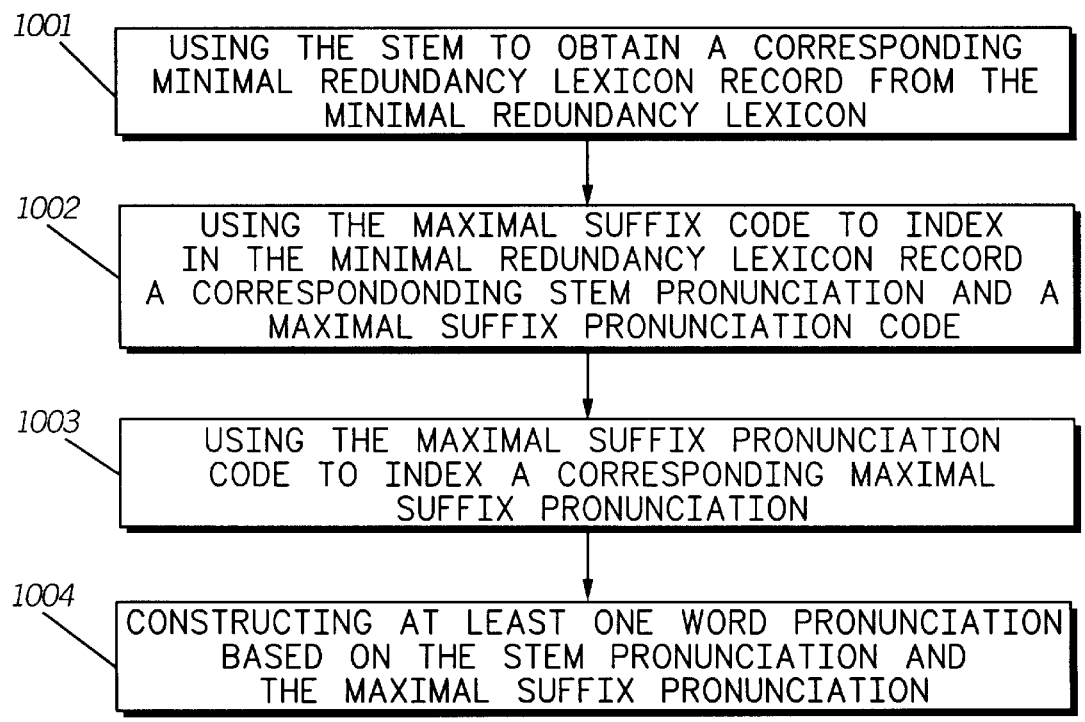
FIG. 10 is a flow chart of one embodiment of steps in accordance with the word pronunciation generation method of the present invention.

As shown in the steps set forth in FIG. 9, numeral 900, the method of the present invention provides the efficient means of generating word pronunciations when given the orthographic forms of words. The method includes the steps of: A) dividing (901) the input word into a stem and a maximal suffix having a maximal suffix code; and B) generating (902) at least one word pronunciation based on the stem and the maximal suffix. Step B contains the steps set forth in FIG. 10, numeral 1000, which includes the steps of: A) using (1001) the stem to obtain a minimal redundancy lexicon record from the minimal redundancy lexicon; B) using (1002) the maximal suffix code to index in the minimal redundancy lexicon record a corresponding stem pronunciation and a maximal suffix pronunciation code; C) using (1003) the maximal suffix pronunciation code to index a corresponding maximal suffix pronunciation; and D) constructing (1004) at least one word pronunciation based on the stem pronunciation and the maximal suffix pronunciation.

Figure 11:
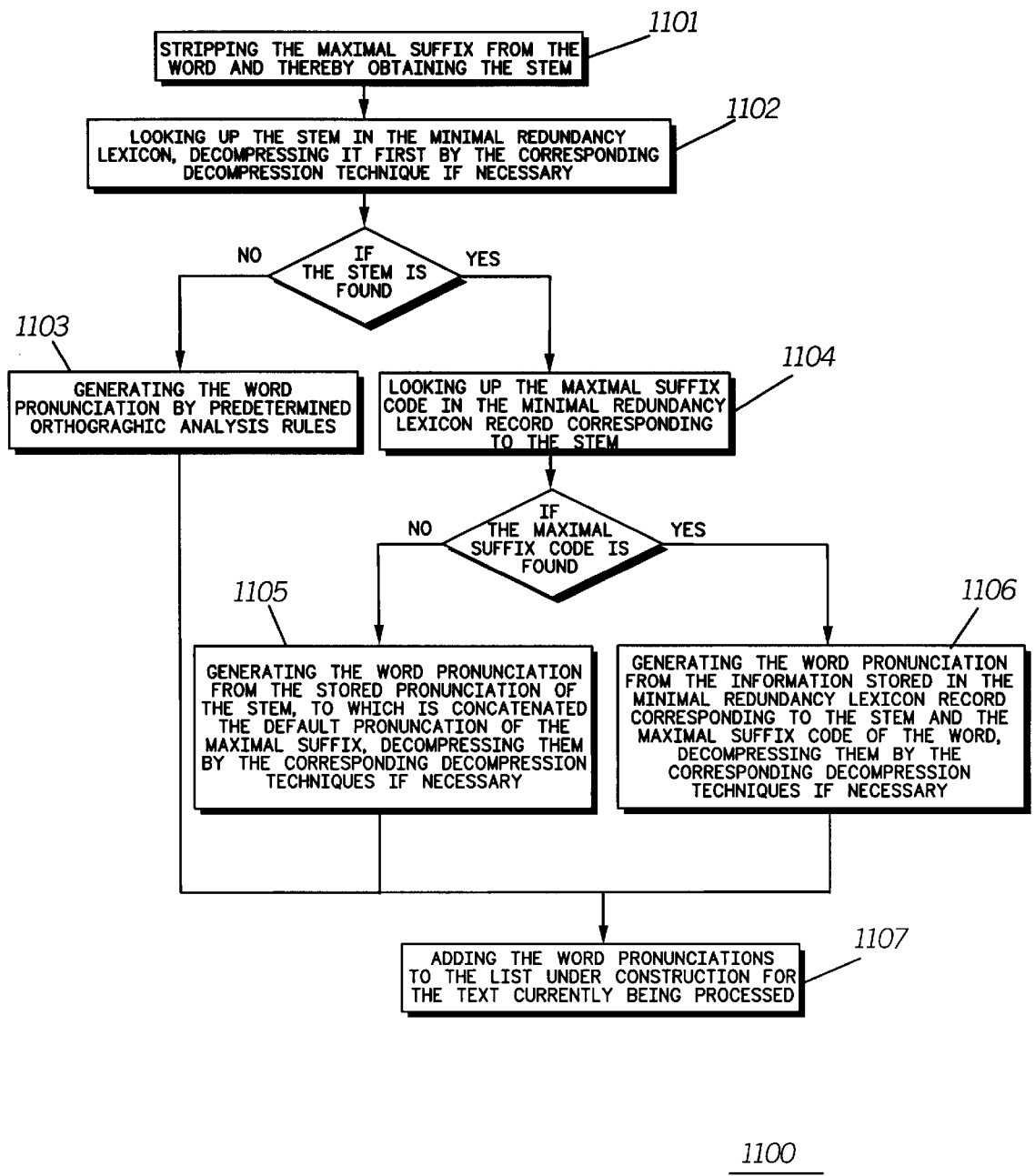
FIG. 11 is a flow chart of one embodiment of steps in accordance with the decoding method of the present invention, adapted to generate default pronunciations.

As shown in the steps set forth in FIG. 11, numeral 1100, the method of the present invention provides the efficient means of generating word pronunciations when given the orthographic forms of words. The method includes the steps of: A) stripping (1101) the maximal suffix from the word and thereby obtaining the stem; B) looking up (1102) the stem in the minimal redundancy lexicon, decompressing it first by the corresponding decompression technique if necessary; C) if the stem fails to be found, generating (1103) the word pronunciation by predetermined orthographic analysis rules; D) if the stem is found, looking up (1104) the maximal suffix code in the minimal redundancy lexicon record corresponding to the stem; E) if the maximal suffix code fails to be found, then generating (1105) the word pronunciation from the stored pronunciation of the stem, to which is concatenated the default pronunciation of the maximal suffix, decompressing them by the corresponding decompression techniques if necessary; F) if the maximal suffix code is found, then generating (1106) the word pronunciation from the information stored in the minimal redundancy lexicon record corresponding to the stem and maximal suffix code of the word, decompressing them by the corresponding decompression techniques if necessary; and G) adding (1107) the word pronunciations to the list under construction for the text currently being processed.

Figure 12:
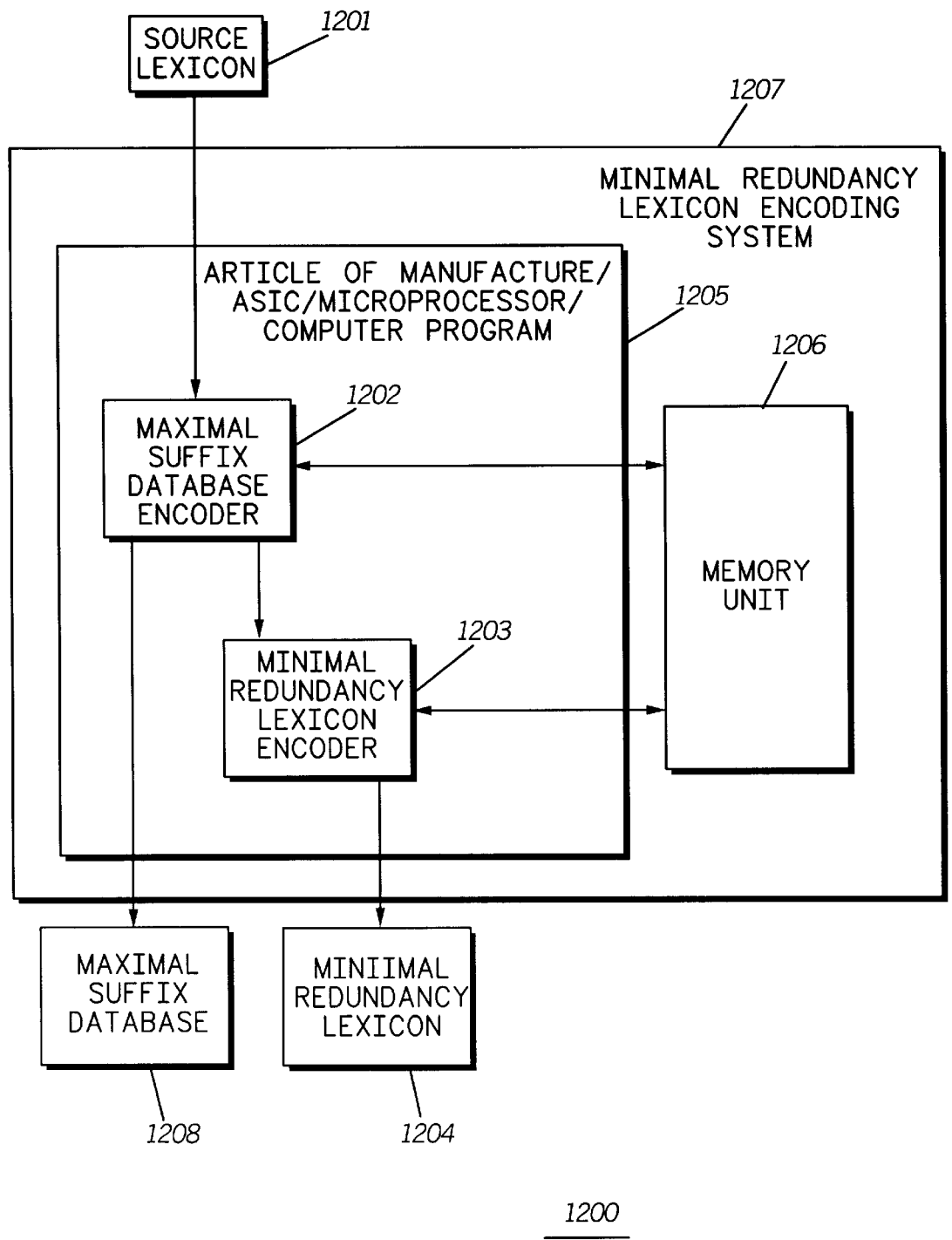
FIG. 12 is a schematic representation of a device/system for encoding the minimal redundancy lexicon in accordance with the present invention.

FIG. 12, numeral 1200, is a schematic representation of a device/system for encoding the minimal redundancy lexicon in accordance with the present invention, which provides efficient generation of random-access retrieval keys from the orthographic forms of words. The device is an article of manufacture/ASIC/microprocessor/computer program (1205) and the system is a minimal redundancy lexicon encoding system (1207). The minimal redundancy lexicon encoding system constructs a maximal suffix database (1208) and a minimal redundancy lexicon (1204) from the source lexicon (1201), making use of a memory unit (1206). The maximal suffix database encoder (1202) applies predetermined suffix identification rules to each word in the source lexicon and thereby reduces the word to a stem and a maximal suffix. All maximal suffixes are then collected into a set ordered by the frequency of occurrence of the suffixes in the source lexicon and a unique maximal suffix code is affixed to each maximal suffix. The minimal redundancy lexicon constructor (1203) links the information associated with each disambiguation record to the stem of the word associated with the record and the maximal suffix code for the word, and then constructs the minimal redundancy lexicon records by associating each stem with the corresponding set of records, each of which is identified by its maximal suffix code.

Figure 13:
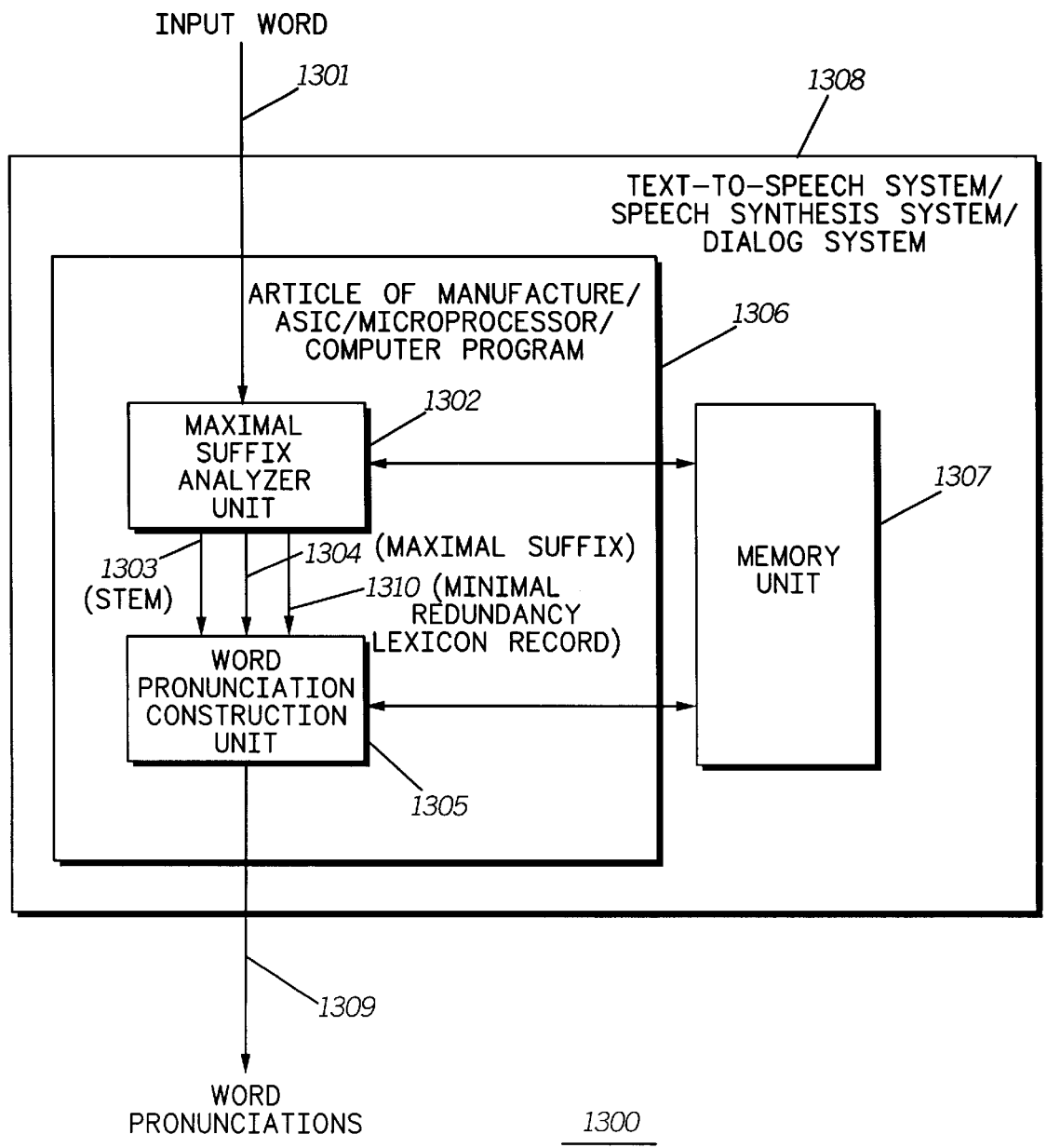
FIG. 13 is a schematic representation of a device/system for accessing the minimal redundancy lexicon in accordance with the present invention.

FIG. 13, numeral 1300, is a schematic representation of a device/system for providing efficient retrieval of pronunciation and disambiguation information from the minimal redundancy lexicon in accordance with the present invention, which constructs word pronunciations (1309) when given an input word (1301). The device is an article of manufacture/ASIC/microprocessor/computer program (1306) and the system is a text-to-speech system/speech synthesis system/dialog system (1308). A maximal suffix analyzer unit (1302) strips the maximal suffix (1304) from the word and thereby obtains the stem (1303). The maximal suffix analyzer unit uses the stem to obtain a corresponding minimal redundancy lexicon record (1310). Both of these processes involve accessing the memory unit (1307). A word pronunciation construction unit (1305) then constructs at least one word pronunciation (1309) by processing the minimal redundancy lexicon record.

Figure 14:
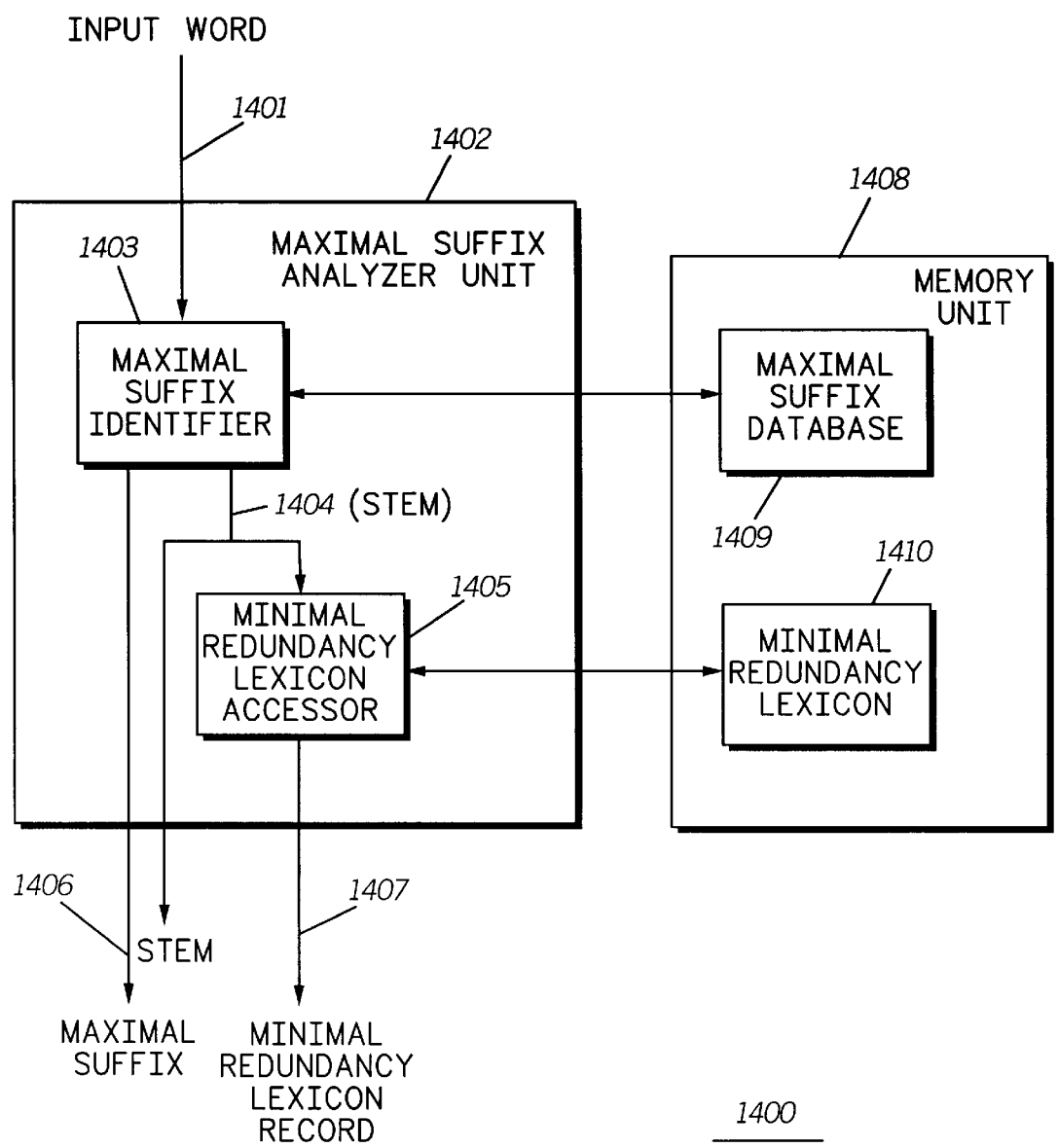
FIG. 14 is a schematic representation of one embodiment of a maximal suffix analyzer unit within a device/system for accessing the maximal suffix database in accordance with the present invention.

FIG. 14, numeral 1400, is a schematic representation of the maximal suffix analyzer unit (1402) in a device/system for accessing the minimal redundancy lexicon in accordance with the present invention, which provides efficient means of constructing word pronunciations when given the orthographic forms of input words. A maximal suffix identifier (1403) accepts as input the input word (1401). Using the maximal suffix database (1409) in the memory unit (1408), the maximal suffix identifier segments the word into a stem (1404) and a maximal suffix (1406). A minimal redundancy lexicon accessor (1405) then uses the stem to obtain a corresponding minimal redundancy lexicon record (1407) from the minimal redundancy lexicon (1410) in the memory unit.

Figure 15:
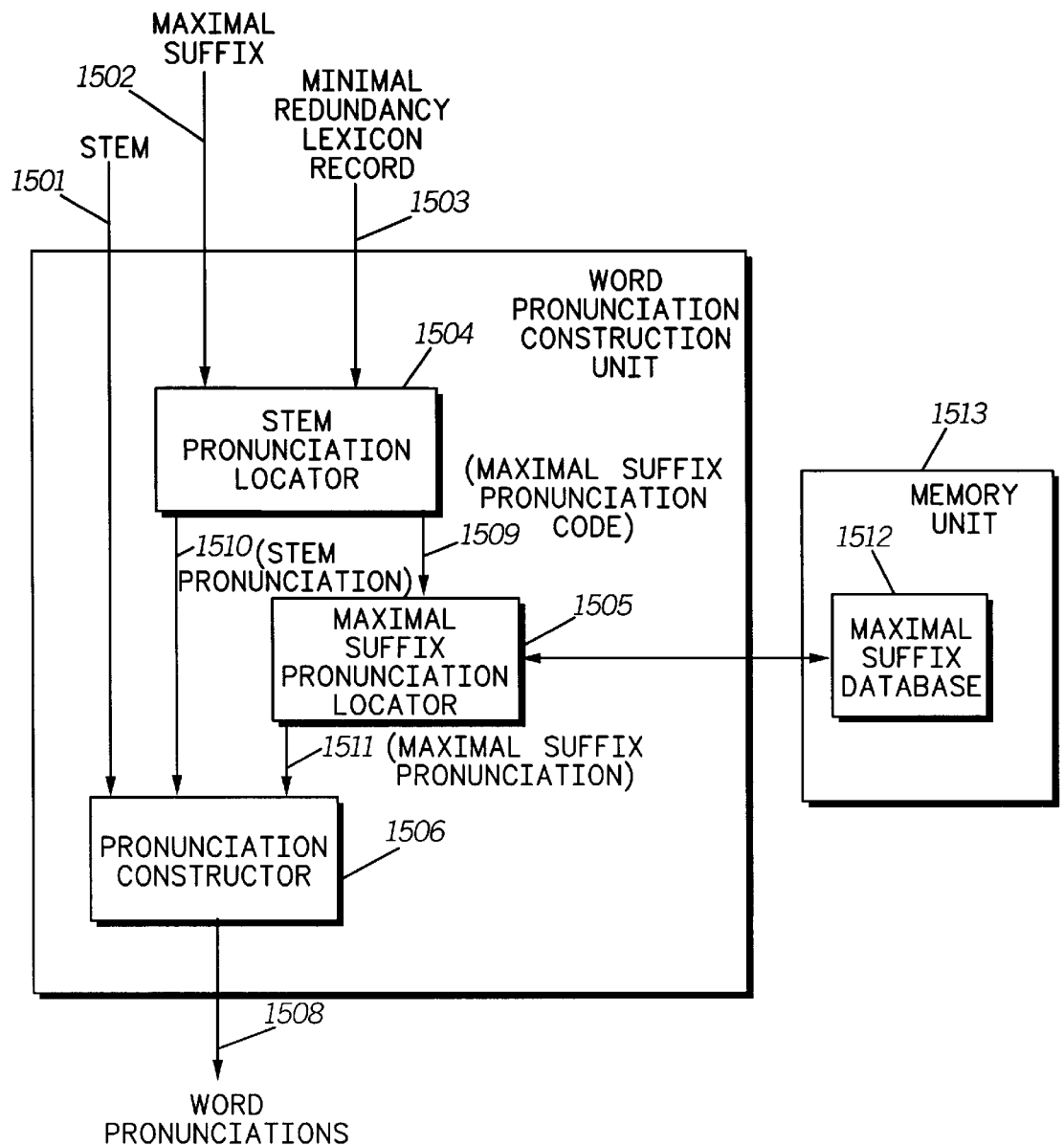
FIG. 15 is a schematic representation of one embodiment of a word pronunciation construction unit within a device/system for accessing the minimal redundancy lexicon in accordance with the present invention.

FIG. 15, numeral 1500, is a schematic representation of the word pronunciation construction unit in a device/system for accessing the minimal redundancy lexicon in accordance with the present invention, which provides efficient means of constructing word pronunciations when given the orthographic forms of input words. A stem pronunciation locator (1504) accepts as input the minimal redundancy lexicon record (1503) and the maximal suffix (1502) having a maximal suffix code, and uses the maximal suffix code to index a corresponding stem pronunciation (1510) and maximal suffix pronunciation code (1509) in the minimal redundancy lexicon record. A maximal suffix pronunciation locator (1505) uses the maximal suffix pronunciation code to index a corresponding maximal suffix pronunciation (1511). A pronunciation constructor (1506) then receives as input the stem (1501), the stem pronunciation, and the maximal suffix pronunciation, from which it generates at least one word pronunciation (1508).

The method may be implemented by computer readable program code on a computer usable medium. Software implementing the method may be embedded in a microprocessor or a digital signal processor. The system may be embodied in a tangible medium having computer program code. Alternatively, an application specific integrated circuit (ASIC) may implement the method, or a combination of any of these implementations may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing word pronunciation based on efficient retrieval of stored pronunciation information and disambiguation information for an input word, comprising the steps of:

A) dividing the input word into a stem and a maximal suffix having a maximal suffix code; and
   B) generating at least one word pronunciation based on the stem and the maximal suffix using stored pronunciation that includes minimal redundancy in suffix information and stem information.

2. The method of claim 1 wherein the stored pronunciation information comprises a minimal redundancy lexicon consisting of a plurality of minimal redundancy lexicon records.

3. The method of claim 2 wherein Step B of claim 1 comprises the steps of:

A) using the stem to obtain a corresponding minimal redundancy lexicon record from the minimal redundancy lexicon;
   B) using the maximal suffix code to index in the minimal redundancy lexicon record a corresponding stem pronunciation and a maximal suffix pronunciation code;
   C) using the maximal suffix pronunciation code to index a corresponding maximal suffix pronunciation; and
   D) constructing at least one word pronunciation based on the stem pronunciation and the maximal suffix pronunciation.

4. The method of claim 3 wherein additional linguistic information is linked to the stored pronunciation information.

5. The method of claim 4 wherein the additional linguistic information linked to the stored pronunciation information is retrieved along with the stored pronunciation information.

6. The method of claim 1 wherein the stored pronunciation information is generated by:

A) applying predetermined suffix identification rules to each word in the source lexicon, to provide the stem and the maximal suffix;
   B) affixing to each maximal suffix a unique maximal suffix code;
   C) generating a disambiguation record from the disambiguation information associated with each word and linking the disambiguation record to the stem of the word and the maximal suffix code of the word; and
   D) constructing minimal redundancy lexicon records by linking each stem to a corresponding set of disambiguation records, each of which is identified by the maximal suffix code of the associated word.

7. The method of claim 6 further including compressing at least one of: the set of stems, maximal suffixes, stem pronunciations, and maximal suffix pronunciations using one of:

A) multigram compression;
   B) Huffman coding;
   C) arithmetic coding; and
   D) a combination of at least two of A–C.

8. The method of claim 7 further including decompressing the stems by a corresponding decompression technique.

9. The method of claim 7 further including decompressing the maximal suffixes by a corresponding decompression technique.

10. The method of claim 7 further including decompressing the stem pronunciations by a corresponding decompression technique.

11. The method of claim 7 further including decompressing the maximal suffix pronunciations by a corresponding decompression technique.

12. An article of manufacture/application specific integrated circuit/microprocessor/computer program for providing efficient retrieval of pronunciation and disambiguation information from a memory unit containing a maximal suffix database and a minimal redundancy lexicon, comprising a computer usable medium having computer readable program code means thereon comprising:

A) a maximal suffix analyzer means, coupled to receive an input word and coupled to the memory unit, for dividing the input word into a stem and a maximal suffix having a maximal suffix code; and
   B) a word pronunciation constructor means, coupled to the maximal suffix analyzer means and the memory unit, for generating a word pronunciation based on the stem and the maximal suffix using stored pronunciation that includes minimal redundancy in suffix information and stem information.

13. The article of manufacture/application specific integrated circuit/microprocessor/computer program of claim 12 wherein the maximal suffix analyzer means comprises:

A) a maximal suffix identifier coupled to receive the input word and coupled to the maximal suffix database in the memory unit, for dividing the input word into the stem and the maximal suffix having the maximal suffix code; and B) a minimal redundancy lexicon accessor, coupled to the maximal suffix identifier and to the minimal redundancy lexicon in the memory unit, for using the stem to retrieve a minimal redundancy lexicon record.

14. The article of manufacture/application specific integrated circuit/microprocessor/computer program of claim 12 wherein the word pronunciation constructor means comprises:

A) a stem pronunciation locator, coupled to receive a minimal redundancy lexicon record and the maximal suffix having the maximal suffix code, that uses the maximal suffix code to index at least one maximal suffix pronunciation code and corresponding stem pronunciation in the minimal redundancy lexicon record;

B) a maximal suffix pronunciation locator, coupled to the stem pronunciation locator and the maximal suffix database in the memory unit, that uses the maximal suffix pronunciation code to obtain a corresponding maximal suffix pronunciation from the maximal suffix database; and C) a pronunciation constructor, coupled to the stem pronunciation locator and the maximal suffix pronunciation locator, that constructs at least one word pronunciation based on the stem pronunciation and the maximal suffix pronunciation.

15. The article of manufacture/application specific integrated circuit/microprocessor/computer program of claim 12 wherein the maximal suffix database and the minimal redundancy lexicon are generated by:

A) a maximal suffix database encoder, coupled to receive a source lexicon and coupled to the memory unit, for constructing a maximal suffix database; and B) a minimal redundancy lexicon encoder, coupled to the maximal suffix database encoder and the memory unit, for encoding a minimal redundancy lexicon.

16. The article of manufacture/application specific integrated circuit/microprocessor/computer program of claim 15 further including compressing at least one of: the set of stems, maximal suffixes, stem pronunciations, and maximal suffix pronunciations using one of:

A) multigram compression;

B) Huffman coding;

C) arithmetic coding; and

D) a combination of at least two of A–C.

17. The article of manufacture/application specific integrated circuit/microprocessor/computer program of claim 15 further including decompressing the stems by a corresponding decompression technique.

18. The article of manufacture/application specific integrated circuit/microprocessor/computer program of claim 15 further including decompressing the maximal suffixes by a corresponding decompression technique.

19. The article of manufacture/application specific integrated circuit/microprocessor/computer program of claim 15 further including decompressing the stem pronunciations by a corresponding decompression technique.

20. The article of manufacture/application specific integrated circuit/microprocessor/computer program of claim 15 further including decompressing the maximal suffix pronunciations by a corresponding decompression technique.

21. The text-to-speech system/speech synthesis system/dialog system of claim 15 further including decompressing the stems by a corresponding decompression technique.

22. The text-to-speech system/speech synthesis system/dialog system of claim 15 further including decompressing the maximal suffixes by a corresponding decompression technique.

23. The text-to-speech system/speech synthesis system/dialog system of claim 15 further including decompressing the stem pronunciations by a corresponding decompression technique.

24. The text-to-speech system/speech synthesis system/dialog system of claim 15 further including decompressing the maximal suffix pronunciations by a corresponding decompression technique.

25. A text-to-speech system/speech synthesis system/dialog system embodied in a tangible medium having computer readable program code means for implementing the steps of:

A) dividing an input word into a stem and a maximal suffix having a maximal suffix code; and B) generating at least one word pronunciation based on the stem and the maximal suffix using stored pronunciation that includes minimal redundancy in suffix information and stem information.

26. The text-to-speech system/speech synthesis system/dialog system of claim 25 wherein Step B comprises the steps of:

A) using the stem to obtain a corresponding minimal redundancy lexicon record from the minimal redundancy lexicon;

B) using the maximal suffix code to index in the minimal redundancy lexicon record a corresponding stem pronunciation and a maximal suffix pronunciation code;

C) using the maximal suffix pronunciation code to index a corresponding maximal suffix pronunciation; and D) constructing at least one word pronunciation based on the stem pronunciation and the maximal suffix pronunciation.

27. The text-to-speech system/speech synthesis system/dialog system of claim 25 wherein the stored pronunciation information is generated by:

A) applying predetermined suffix identification rules to each word in the source lexicon, to provide the stem and the maximal suffix;

B) affixing to each maximal suffix a unique maximal suffix code;

C) generating a disambiguation record from the disambiguation information associated with each word and linking the disambiguation record to the stem of the word and the maximal suffix code of the word; and D) constructing minimal redundancy lexicon records by linking each stem to a corresponding set of disambiguation records, each of which is identified by the maximal suffix code of the associated word.

28. The text-to-speech system/speech synthesis system/dialog system of claim 27 further including compressing at least one of: the set of stems, maximal suffixes, stem pronunciations, and maximal suffix pronunciations using one of:

A) multigram compression;

B) Huffman coding;

C) arithmetic coding; and

D) a combination of at least two of A–C.

29. A method for providing word pronunciation based on efficient retrieval of stored pronunciation information and disambiguation information for an input word, comprising the steps of:

A) applying predetermined suffix identification rules to each word in a source lexicon, to provide a stem and a maximal suffix;

B) affixing to each maximal suffix a maximal suffix code;

C) generating a disambiguation record from disambiguation information associated with each word and linking the disambiguation record to the stem of the word and the maximal suffix code of the word; and D) constructing minimal redundancy lexicon records by linking each stem to a corresponding set of disambiguation records, each of which is identified by the maximal suffix code of the word associated with the stem.

30. The method of claim 29 further including, after step D, the step of compressing the minimal redundancy lexicon records by applying field-specific encoding and compression algorithms to specified fields of each minimal redundancy lexicon record.

* * * * *